(12) United States Patent
Ohman et al.

(10) Patent No.: US 10,263,930 B2
(45) Date of Patent: Apr. 16, 2019

(54) SYSTEM AND METHOD FOR BLOCKING NOTIFICATION MESSAGES DURING SCREEN SHARING

(71) Applicant: Genband US LLC, Plano, TX (US)

(72) Inventors: Todd Olof Ohman, Almonte (CA); Dany Sylvain, Gatineau (CA)

(73) Assignee: GENBAND US LLC, Plano, TX (US)

( * ) Notice: Subject to any disclaimer, the term of this patent is extended or adjusted under 35 U.S.C. 154(b) by 309 days.

(21) Appl. No.: 15/060,186

(22) Filed: Mar. 3, 2016

(65) Prior Publication Data

US 2017/0257331 A1 Sep. 7, 2017

(51) Int. Cl.
*H04L 12/58* (2006.01)
*H04L 29/06* (2006.01)

(52) U.S. Cl.
CPC .......... *H04L 51/12* (2013.01); *H04L 65/4015* (2013.01)

(58) Field of Classification Search
CPC ............................. H04L 51/12; H04L 65/4015
See application file for complete search history.

(56) References Cited

U.S. PATENT DOCUMENTS

| | | | | |
|---|---|---|---|---|
| 7,203,755 B2* | 4/2007 | Zhu | .......... | G06Q 10/10 709/204 |
| 9,749,467 B1* | 8/2017 | Hertzfeld | .......... | H04M 3/42374 |
| 2007/0115388 A1* | 5/2007 | Apelbaum | .......... | H04N 7/148 348/430.1 |
| 2015/0112885 A1* | 4/2015 | Fadell | .......... | G08B 27/00 705/330 |
| 2017/0180553 A1* | 6/2017 | Aleksin | .......... | H04M 3/5183 |

OTHER PUBLICATIONS

Cisco Webex Connect Release Notes. May 3, 2011. Version 7.04. https://support.webex.com/webexconnect/70/rn/connectreleasenotes_c70.pdf (Year: 2011).*
WebEx Meeting Center Release Notes and FAQs. Oct. 23, 2013. Version WBS29.1. https://www.cisco.com/c/dam/en/us/td/docs/collaboration/meeting_center/wbs29/Meeting_Center_Release_Notes_and_FAQs_WBS29.pdf (Year: 2013).*
Cisco WebEx Enabled TelePresence Configuration Guide—TMS 14.3.1—WebEx Meeting Center WBS29, Configuring Cisco MCU and TelePresence Server, Rev. Jul. 2014, Chpt 3, pp. 1-8.
Citrix Online, "GoToMeeting User Guide, Organizing, Conducting, Presenting and Attending Web Meetings," Ver. 5.0, 2012, pp. 1-199.
Nortel, "Nortel Multimedia Conferencing User Guide," Release: 6.0, Rev. Feb. 2004. Publication: NN44460-103, Release date: Jul. 7, 2009, pp. 1-48.

* cited by examiner

*Primary Examiner* — Tamara T Kyle
(74) *Attorney, Agent, or Firm* — Haynes and Boone, LLP

(57) ABSTRACT

Systems and methods are disclosed for suspending notification messages at a presenter's computer during a presentation. For example, a method comprises: receiving, by an operating system of a computer, a first instruction from a screensharing application to suspend displaying notification messages by the operating system of the computer. The method further comprises sending visual media of a display screen of the computer by the operating system to the screensharing application during a screen sharing communication session. The method further comprises disregarding the request during the screen sharing communication session in accordance with the first instruction, in response to receiving a request from a first application to display a notification message on the display screen.

20 Claims, 8 Drawing Sheets

SYSTEM AND METHOD FOR BLOCKING NOTIFICATION MESSAGES DURING SCREEN SHARING

TECHNICAL FIELD

The present description relates, in general, to communication systems and, more specifically, to systems and techniques for preventing notification messages from displaying during a screensharing communication session.

BACKGROUND

Internet-based screensharing sessions are popular ways to collaborate, and are used to conduct presentations for various purposes such as business meetings, product sales pitches, symposiums, and the like. These sessions have the advantage of allowing groups of people to attend a presentation without having to be physically in the same room.

However, screensharing sessions are often conducted from a presenter's personal or private business computer, and therefore involve sharing the contents of the display of the presenter's computer with the participants of the screensharing session. This raises various privacy and security concerns, including the possibility that notifications and instant messages received by the presenter may "pop up" on the presenter's display during a screen sharing session, and thus be inadvertently shared with the participants of the screensharing session.

Instant messaging systems allow users to communicate asymmetrically by sending text messages back and forth between instant messaging applications on user computers using various appropriate protocols such as Extensible Messaging and Presence Protocol (XMPP). Internet Relay Chat (IRC), Rendezvous Protocol (RVP), etc. Typically, when a user is logged into an instant messaging service via an instant messaging application, some subset of other users of the service (often those on a user's "friend list") can send messages to the user without the user's prior approval.

For the user's convenience, the instant messaging application may move a messaging window containing the newly received message to the front of the user's display so that the user does not miss the message. Alternatively or in addition, an operating system on the user's computer may cause an alert of some sort to be displayed to the user. For example, the alert may include a small window in a corner of the display which contains at least a preview of the received instant message for several seconds before disappearing in order to alert the user to the received message. The operating system may also facilitate display of other types of notifications as a small window in a corner of the display. For example, the operating system may notify the user that an application requires an update, that a security application has discovered a vulnerability, that a calendar appointment is upcoming, that a new email has been received, or the like.

The contents of instant messages, emails, calendar appointments, and the like may be sensitive. Sharing this sensitive information could be detrimental to business, could reveal legally protected information, or otherwise be very embarrassing for the presenter. It may therefore be desirable to implement systems and methods for preventing such notifications and messages to display on a user's computer screen while that user is presenting in a screensharing session.

SUMMARY

In one example, a method comprises: receiving, by an operating system of a computer, a first instruction from a screensharing application to suspend displaying notification messages by the operating system of the computer. The method further comprises sending visual media of a display screen of the computer by the operating system to the screensharing application during a screen sharing communication session. The method further comprises disregarding the request during the screen sharing communication session in accordance with the first instruction, in response to receiving a request from a first application to display a notification message on the display screen.

In another example, a computing device comprises: a memory containing a machine readable medium comprising machine executable code having stored thereon instructions for performing a method of suspending display of textual messages. The computing device father comprises a processor coupled to the memory. The processor is configured to execute the machine executable code to perform the following actions by a messaging application executed by the processor: receive, by the messaging application, a first instruction from a screensharing application to suspend displaying textual messages on a display screen of a computer executing the screen sharing application during a screen sharing, communication session, store a first textual message received from a messaging server in response to receiving the first instruction and without causing the first textual message to be displayed, receive a second instruction from the screensharing application to resume displaying textual messages, wherein the second instruction is received in response to an end of the screen sharing communication session, and display the first textual message in response to receiving the second instruction.

In another example, a computer program having a computer readable medium tangibly recording computer program logic, the computer program product comprises: code to suspend sending messages from a messaging server to a messaging application, in response to receiving a first instruction to suspend sending messages to the messaging application during a screen sharing communication session.

DETAILED DESCRIPTION

Figure 1:
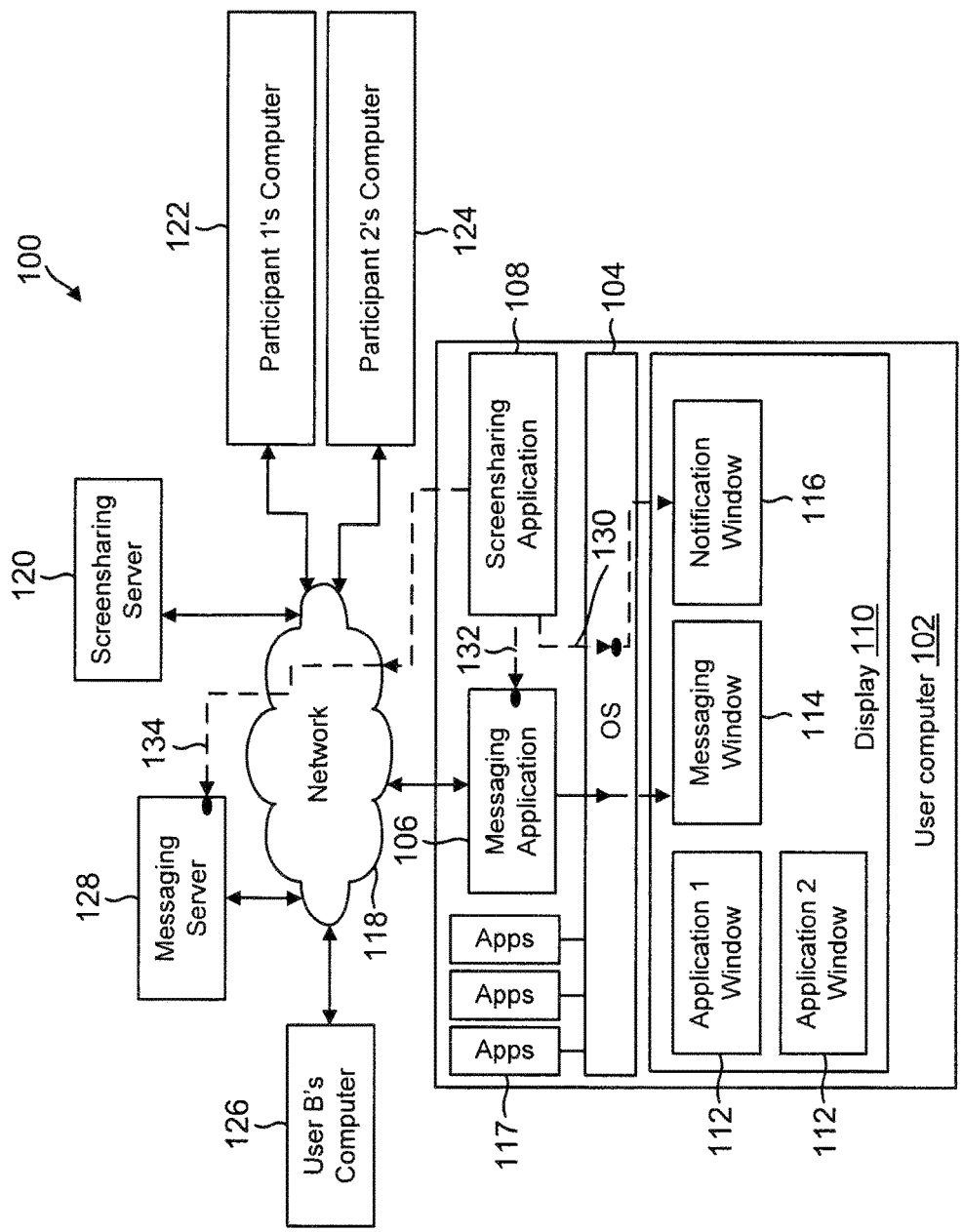
FIG. 1 is a diagram of an embodiment of a system connecting user devices to a collaboration server and a collaboration media sever via a network.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Embodiments of the present disclosure describe systems and methods for blocking notification messages from displaying on a user's computer while the user is sharing the contents of his display output with other users. A notification message may include, for example, an instant message popup notification, an operating system (OS) notification (such as an application update notification, a security scan notification, or the like), or the like. The user may share the contents of his display via a screensharing application, which may send the graphics output of the user's computer to the computers of participants in a screensharing session. The screensharing application may send the graphics output via a screensharing server, or by sending through a direct network connection to a participant's computer.

Screensharing is often used to conduct presentations. For example, a user may create a slide deck as a visual aid for an oral presentation, and may use a screensharing application to present the slides to a group of participants. Such a presentation may be in person or virtual. In the in-person example, the presenter's computer's graphical output may be projected onto a screen, a wall, or the like. In a virtual presentation, the presenter's computer's graphical output may be shared via a communication network (e.g., the Internet) with participants' computers, which may display the graphical output in an application window for the participants.

Many applications on a modern computer provide various notifications to the user. In many cases, these notifications "pop up" onto the display for the user's convenience. For instance, a pop-up may include a selectable, visual object that is rendered on top of a user's display screen, and it may include a part of a message or an entire message and it may be substantially smaller than the entirety of the display screen so that it is not too intrusive but is still readable. For example, an email management application may provide a pop up notification upon receipt of a new email, and may include in that notification, a preview of the subject of the email and the first few lines of the body of the email. A calendar application may provide a pop up notification reminding the user of an approaching calendar appointment, and may include in the notification a name of the appointment and a brief description of the appointment, other attendees of the appointment, or the like. A security application may provide notifications of security vulnerabilities that need to be addressed. For simplicity, all such pop up notifications or notification windows will be referred to as notification windows below. All of the above examples of notifications could contain sensitive information that the user does not intend to share with other people, but which participants in a screensharing session may nonetheless see.

In an embodiment of the present disclosure, a screensharing application running on a user's computer may identify various applications, either locally on the user's computer or remotely on other devices such as server computers, that can cause notification windows to appear on the user's computer. When screensharing is initiated through the screensharing application, the screensharing application may send a request to one or more of the identified applications, requesting that those applications not trigger notification messages on the user's computer. When screensharing is ended, the screensharing application may inform the other applications that they may resume triggering notifications. Several examples are described below.

FIG. 1 illustrates an example network architecture 100 adapted according to one embodiment. The network architecture 100 includes user computer 102, which is associated with user A in this example. User computer 102 may run various applications, which may include an operating system (OS) 104, a messaging application 106, a screensharing application 108, and various other applications 117. The user computer 102 has at least one display 110, which contains various display windows such as miscellaneous application windows 112, messaging window 114, and notification window 116. In this example, the display 110 includes an interactive, visual rendering of the Graphical User Interface (GUI) by the OS 104 on a hardware monitor or other physical display screen of user computer 102.

The OS 104 underlies the functionality of much of the user computer 102, coordinating communication between multiple applications, communication between applications and input/output (I/O) devices, and the like. In some embodiments, OS 104 may create notifications that are displayed on display 110 in a notification window 116. Such notifications may include, for example, software update reminders, security risk notifications, received email previews, calendar appointment reminders, and the like. The notifications may in some cases be created by an application on the computer 102 that informs the OS 104 that it has a notification for user A.

Messaging application 106 facilitates receipt and delivery of, for example, instant messages between the user A's computer 102 and other user computers. When messaging application 106 receives an instant message from another user's computer, such as user B's computer 126, it displays the message to user A, for example via a messaging window 114 on display 110. The messaging application may communicate with the display 110 via the OS 104. For example, the OS 104 may provide to applications a software framework for causing display windows to appear.

User computer 102 is connected to a network 118, which may be a local area network (LAN), a wide area network (WAN) such as the Internet, or any other appropriate network. The user computer 102 may communicate with various other devices over the network 118, including a screensharing server 120, screensharing participants' computers 122 and 124, one or more other user computers such as User B's computer 126, a messaging server 128, or the like. For example, user computer 102 may receive instant messages from user B's computer 126 or a messaging server 128. Additionally, user computer 102 may share the contents of display 110 with screensharing participants' computers 122 and 124 either directly or via screensharing server 120. Dotted arrows 130, 132, and 134 illustrate requests sent from the screensharing, application 108 to the OS 104, messaging application 106, and messaging server 128, respectively, to suspend triggering notifications. In some embodiments, the requests sent to messaging application 106 and messaging server 128 may be facilitated by OS 104.

Figure 2:
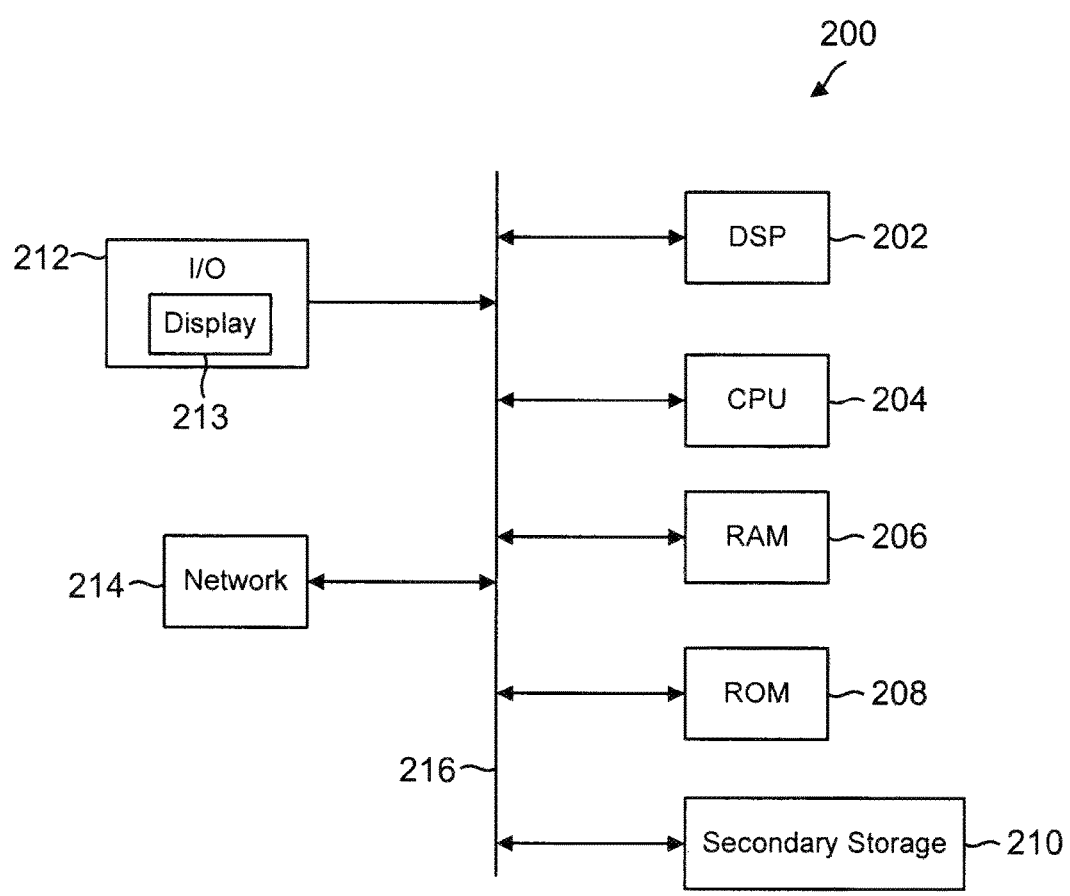
FIG. 2 is an illustration of an example computer system adapted according to an embodiment of the present disclosure.

FIG. 2 illustrates an example computer system 200 adapted according to one embodiment of the present disclosure. The computer system 200 includes an example system on which embodiments of the present disclosure may be implemented (such as screensharing server 120, messaging server 128, participant computers 122 and 124, or user computers 102 and 126). The computer system 200 includes a digital signal processor (DSP) 202, a central processing unit (CPU) 204, a random access memory (RAM) 206, a read-only memory (ROM) 208, secondary storage 210, input/output (I/O) devices 212, and a network interface 214, all of which may be communicatively coupled via a bus 216.

The CPU 204 may be implemented using hardware or a combination of hardware and software, Although illustrated as a single CPU, the CPU 204 is not so limited and may include multiple processors. The CPU 204 may be implemented as one or more processors, i.e., as one or more chips, cores (e.g., a multi-core processor), field-programmable gate arrays (FPGAs), and/or application specific integrated circuits (ASICs). Likewise, the DSP 202 may be implemented as more than one DSP chip. The DSP 202 may perform transcoding or transrating of a media stream or call flow received by a network interface 214.

The secondary storage 210 may comprise one or more disk drives or solid state drives and is used for non-volatile storage of data and as an over-flow data storage device if the RAM 206 is not large enough to hold all working data. The RAM 206 may be static RAM, dynamic RAM, or the like, and the ROM 208 may be programmable ROM (PROM), erasable PROM (EPROM), electrically EPROM (EEPROM), or the like. The secondary storage 210 may be used to store programs that are loaded into the RAM 206 when such programs are selected for execution. The ROM 208 is used to store instructions and perhaps data that are read during program execution. The ROM 208 is a non-volatile memory device that typically has a small memory capacity relative to the larger memory capacity of the secondary storage. The RAM 206 is used to store volatile data and perhaps to store instructions. Access to both the ROM 208 and the RAM 206 is typically faster than to the secondary storage 210.

The computer system 200 includes network interfaces 214. There may be a network interface 214 for each communication line (e.g., electrical or optical) coupled to the computer system 200. A network interface 214 may be bidirectional or unidirectional, depending on the embodiment. Each network interface 214 is adapted to couple computer system 200 to a communication link (e.g., a wired or wireless communication link). In the examples of FIG. 1, network interfaces 214 may couple a respective device to network 108 and/or to another network (not shown) such as a wireless network, cellular network or other telephony network.

The I/O devices 212 may include a keyboard, a computer mouse, a microphone, and/or a display device 213 for allowing a user to provide input to and receive output from the computer system 200. In one example, the user device 102 of FIG. 1 may include tablet computers having touch-screen interfaces, although the scope of embodiments is not limited to any particular I/O devices 212.

It is understood that by programming and/or loading executable instructions onto the computer system 200, at least one of the CPU 204, the RAM 206, and/or the secondary storage 210 are changed, transforming the computer system 200 in part into a particular machine or apparatus having the functionality taught by the present disclosure. The executable instructions may be stored on the RAM 206 or secondary storage 210 and loaded into the CPU 204 for execution. The device functionality described with respect to FIGS. 1 and 3-6 may be implemented as a software application running on the CPU 204 and using the RAM 206, the ROM 208, and/or secondary storage 210.

Logic may be encoded in a non-transitory computer-readable medium, such as RAM 206 and/or secondary storage 210. Such a medium can take many forms, including but not limited to, non-volatile media and volatile media. In various implementations, non-volatile media includes optical or magnetic disks, such as secondary storage 210, and volatile media includes dynamic memory, such as various types of RAM 206. CPU 204 reads application code from the readable medium and executes the code to provide the described functionality.

Figure 3:
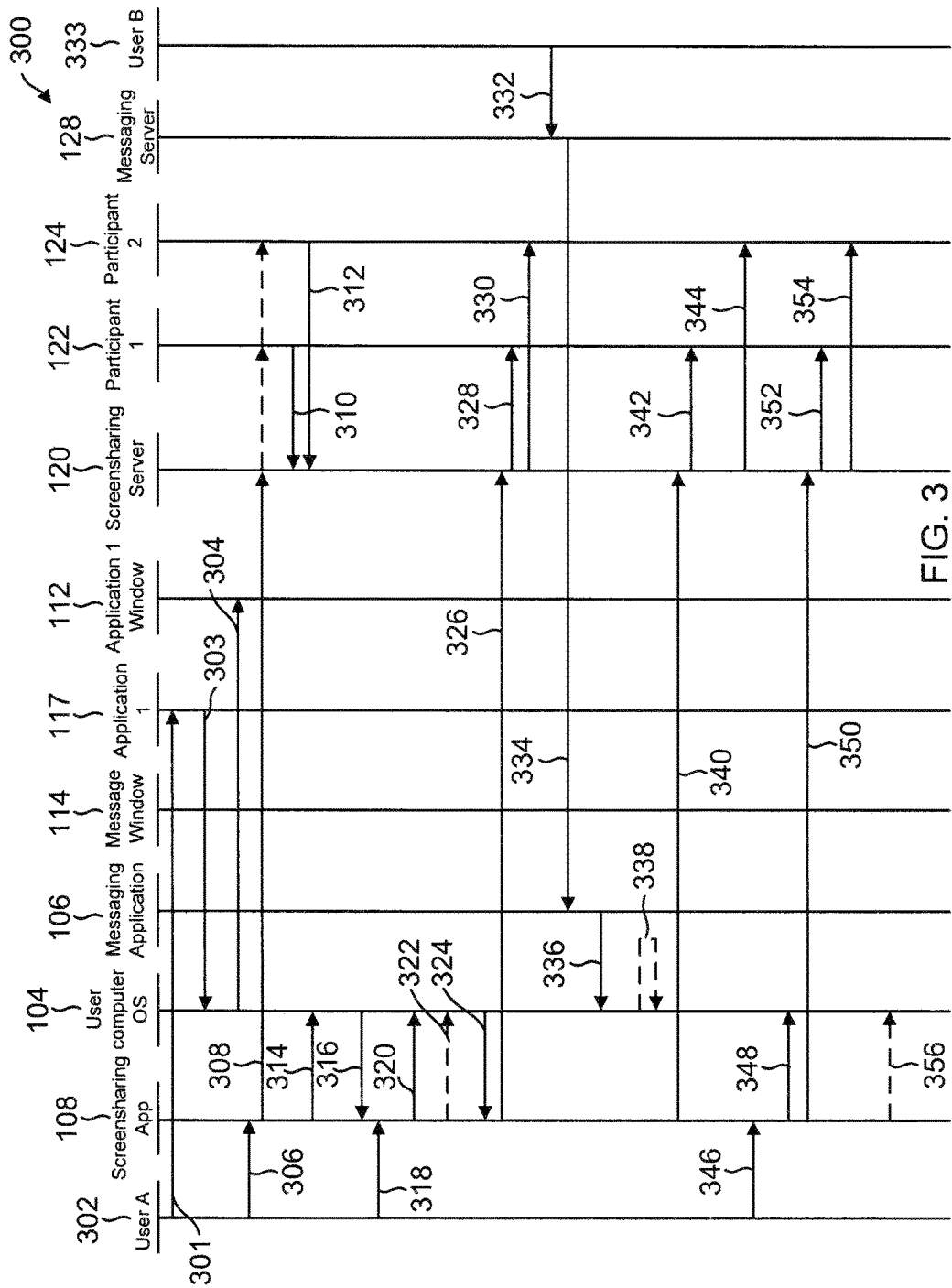
FIG. 3 is an illustration of an example signal flow diagram according to one embodiment for blocking notification messages at the operating system level.
Figure 4:
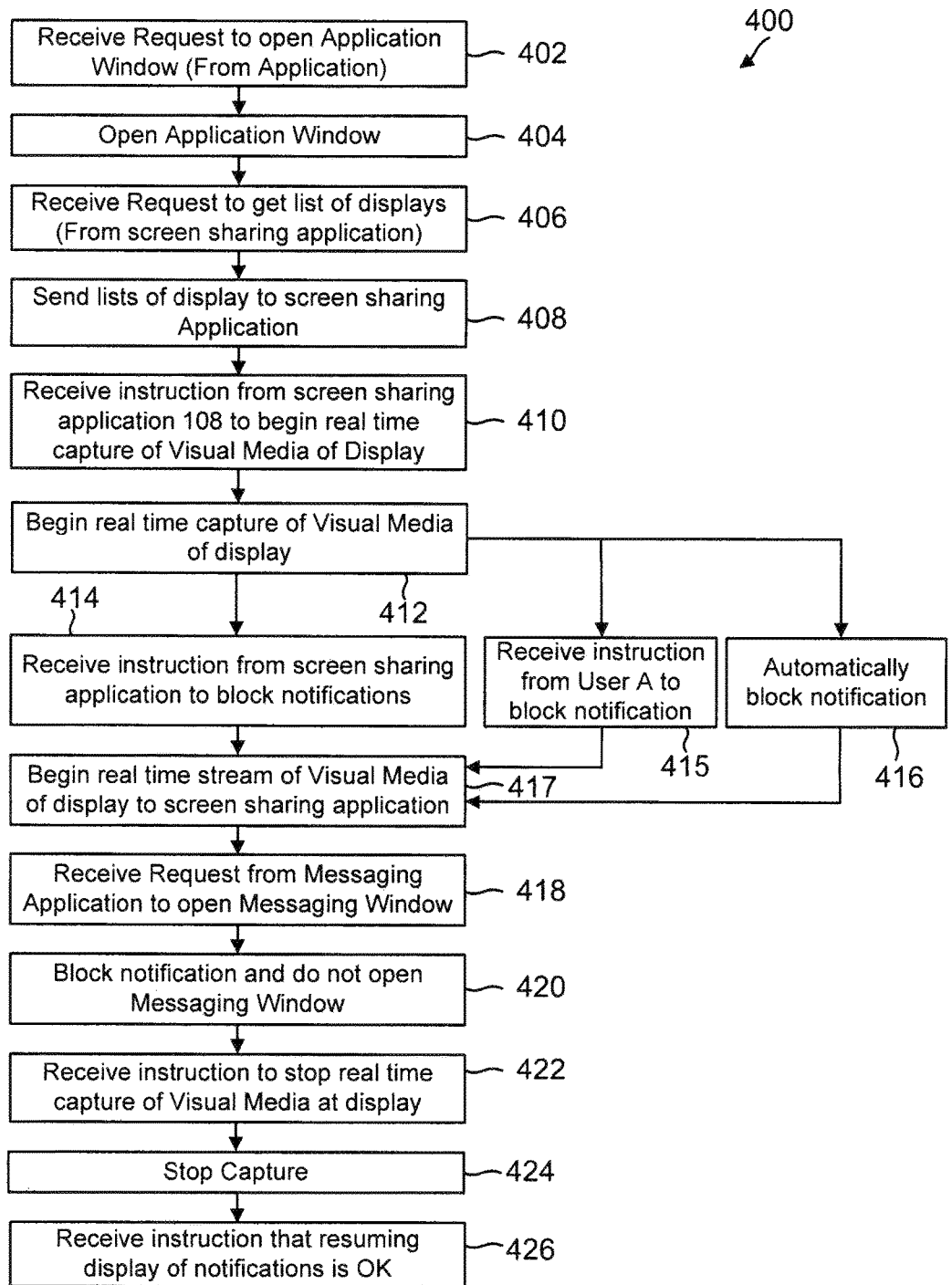
FIG. 4 is a flowchart illustrating a method for blocking notification messages at the operating system level.

The embodiments of FIGS. 3 and 4 describe a system and method wherein a screensharing application running, on a user computer communicates with an operating system running on the user computer to coordinate blocking display of notification messages by the operating system during a screensharing session. The operating system may be responsible for performing various functions of the user computer including displaying content on the user computer's display, and therefore is able to ignore requests to display notification messages regardless of source (e.g., instant message popups, email, popups, etc.), and may store blocked messages to display notification messages to the user after the screensharing session has ended.

FIG. 3 is a signal diagram 300 of notification blocking performed by the operating system, such as OS 104 of FIG. 1. It is understood that signal diagram 300 is one embodiment, and the actions shown in signal diagram 300 may be performed in a different order in other embodiments. Communications that take place in the actions of signal diagram 300 may be conducted with Hypertext Transfer Protocol (HTTP), Session Initiation Protocol (SIP), Short Message Peer-to-Peer (SMPP), or any other appropriate protocol. Media streaming that takes place in actions 326-330 may be conducted with h.264, VP8, or any other appropriate protocol that provides for visual media sharing. The below Table 1 contains labels for various elements of FIG. 3.

TABLE 1

Labels for elements of FIG. 3

| Identifier | Description | Identifier | Description | Identifier | Description |
|---|---|---|---|---|---|
| 301 | Open Application Window | 303 | Create application 1 Window | 304 | Open application 1 Window |
| 306 | Start session | 308 | Start session | 310 | Connect |
| 312 | Connect | 314 | Get list of displays | 316 | List of displays |
| 318 | Share displays 110 | 320 | Start capture: Display 110 | 322 | Suspend Notification Windows |
| 324 | Start capture Display 110 | 326 | Content: Display 110 | 328 | Content Display 110 |
| 330 | Content Display 110 | 332 | Message: "Hello" | 334 | Message: "Hello" |
| 336 | Open Message Window: "Hello" | 338 | Message Notification Window blocked | 340 | Content: Display 110 (with no Message |

TABLE 1-continued

Labels for elements of FIG. 3

| Identifier | Description | Identifier | Description | Identifier | Description |
|---|---|---|---|---|---|
| 342 | Content: Display 110 (with no Message Window) | 344 | Content: Display 110 (with no Message Window) | 346 | Window) Stop sharing display 110 |
| 348 | Stop capture: Display 110 | 350 | Stop content Share | 352 | Stop content Share |
| 354 | Stop content Share | 356 | Resume Notification Windows | | |

Beginning at action 301, a first user 302, called user A in this example, interacts with user computer 102 and its OS 104 to command an application 117 to open an application window 112. This application may be an application that user A 302 wishes to use to display material to others via a screensharing session. For example, a slide deck presentation application, an internet browser, a proprietary application whose functionality user A 302 is demonstrating, or the like.

At action 303, the application 117 running on user computer 102 initiates creation of a new application window 112 on display 110 by sending a request to OS 104, which is also running on user computer 102 in this embodiment. It is understood that in other embodiments different components may be running on different devices.

At action 304, OS 104 opens an application window 112 in response to the request from application 117. OS 104 may notify application 117 that the window 112 has been opened so that application 117 may provide contents for display in window 112.

At action 306, first user 302 (user A) commands screensharing application 108 to begin a screensharing session. At action 308, the screensharing application 108 communicates with screensharing server 120 to initiate the screensharing session. As one way to get participants to join the screensharing session, the screensharing application 108 may include information detailing contact information (e.g., IP addresses or SIP addresses) for the participants that user A wishes to include in the screensharing session. In this example, user A wishes for participants 1 and 2 to join the screensharing session. Screensharing server 108 in turn communicates with participant 1's computer 122 and participant 2's computer 124 to connect, them to the screensharing session. In this example, computers 122 and 124 are running a companion screensharing application that facilitates this connection.

At actions 310 and 312, participant 1's computer 122 and participant 2's computer 124 connect to the screensharing server 120 in order to connect to the screensharing session hosted by user A. Once connected to the screensharing session, the companion screensharing applications on computers 122 and 124 may create application windows on the displays of computers 122 and 124. These applications windows may render an image of whatever the screensharing application 108 sends to computers 122 and 124, in this example the entirety of display 110 of user computer 102.

At action 314, the screensharing application 108 requests from OS 104 a list of displays connected to user computer 102. In this example, a single display 110 is connected to the user computer 102, but any number of displays may be connected in other embodiments. At action 316, OS 104 provides the requested list to screensharing application 108, which informs screensharing application 108 that only display 110 is connected to the computer 102. Screensharing application 108 in turn provides this list to user A to allow user A to choose which display or displays to share in the screensharing session.

At action 318, first user 302 (user A) elects to share display 110 in the screensharing session and issues a command accordingly to the screensharing application 108. At action 320, screensharing application 108 requests that the OS 104 capture the contents of display 110 and relay the contents to screensharing application 108. At action 322, screensharing application 108 also requests that the OS 104 suspend displaying notification windows 116 on display 110. The request from screen sharing application 108 to the OS 104 may include any kind of command or message, which may in some embodiments be defined by an Application Programming Interface (API), to allow screensharing application 108 to directly suspend display of notification windows 116.

At action 324, OS 104 begins relaying in real time the content of display 110 to screensharing application 108, and continues doing so until the screensharing application commands it to stop. At action 326, screensharing application 108 relays the real time stream of the content of display 110 to screensharing server 120 in order to share the content with the participants of the screensharing session. At actions 328 and 330, the screensharing server 120 in turn relays the real time stream of the content of display 110 to participant 1's computer 122 and participant 2's computer 124, respectively. The companion screensharing applications on computers 122 and 124 may display the real time stream of the content of display 110 in an application window on computers 122 and 124, thereby facilitating user A's presentation of the material contained in application 117, as well as whatever else is contained in display 110. Although not shown herein, the presentation may further include other kinds of media, such as audio content or text. In such an instance, the actions 326-330 may further include the use of protocols allowing for sharing of those additional types of media content.

At action 332, a second user 333, called user B in this example, operating a user computer 126, sends an instant message to messaging server 128 with instructions to relay the instant message to user A's computer 102. In this example, the message says simply "Hello." At action 334, the messaging server 128 relays this instant message to messaging application 106 on user A's computer 102.

At action 336, messaging application 106 requests that OS 104 open a messaging window 114 on display 110 displaying the message "Hello" that was sent by user B. Alternatively, if a messaging window 114 is already active, the messaging application 106 requests the message "Hello" to be displayed in the messaging window 114, and may additionally request that the messaging window 114 be moved to the "front" of any other application windows 112 on display 110, that an icon related to the messaging application 106 blink, that a notification sound be played, or the like in order to alert user A of the newly received message. It is understood that OS 104 could additionally or alternatively receive requests from other applications 117 to display various messages in notification windows 116, or could internally generate notifications for display in a notification window 116. These messages may include, for example, software update reminders, security risk notifications, received email previews, calendar appointment reminders, and the like.

At action 338, OS 104 blocks display of the message from user B. Accordingly, OS 104 does not create a messaging window 116, add the message to an existing messaging window 116, or move that messaging window 116 to the front of the display 110. Depending on the OS 104's configuration, the OS 104 may or may not still cause an icon related to the messaging application 106 to blink, cause a notification sound to be played, or the like to alert User A that a message was received even though it was not displayed. It is understood that OS 104 also blocks any requests it receives from other applications 117 to display a notification message in a notification window 116, and additionally does not generate a notification window 116 to display any notifications generated internally by OS 104, as described above with respect to action 336.

At action 340, screensharing application 108 continues to relay a real time stream of the content of display 110 to the screensharing server 120, and the content of display 110 does not include a messaging window 116. At actions 342 and 346, the screensharing server 120 continues to relay the real time stream of the content of display 110 to participant 1's computer 122 and participant 2's computer 126. The real time stream of the content of display 110 is accordingly displayed to participants 1 and 2 by the companion screensharing application, but participants 1 and 2 are left unaware that the message "Hello" has been received by user A.

At action 346, some time later, first user 302 (user A) ends the screensharing session by telling the screensharing application 108 to stop sharing the contents of display 110. Accordingly, at, action 348, screensharing application 108 requests that the OS 104 stop capturing the contents of display 110. At action 350, screensharing application 108 stops relaying the real time stream of the content of display 110 to screensharing server 120. The screensharing application 108 may also inform the screensharing server 120 that the screensharing session has been ended. Accordingly, at actions 352 and 354 the screensharing server 120 stops relaying the real time stream of the content of display 110 to participant 1's computer 122 and participant 2's computer 124, and may additionally inform them that the screensharing session has been terminated by user A. At action 356, screensharing application 108 may inform OS 104 that it may resume displaying notification windows 116 on display 110 of user computer 102. OS 104 may or may not then cause the message to be displayed after the screen sharing session has ended.

In this embodiment, OS 104, messaging application 106, and screensharing application 108 run on user A's computer 102. It is understood that in other embodiments these applications may run in some combination on two or more separate devices connected, for example, by a network 118.

FIG. 4 is a flow diagram of a method 400 for blocking notification messages at the operating system level, and it accompanies the description of FIG. 3. Beginning at block 402, as described above at action 303 of signal diagram 300, the OS 104 running on a user A's computer 102 receives a request from an application 117 to open an application window 112. Moving to block 404, as described above at action 304 of signal diagram 300, OS 104 opens the application window 117 as requested.

Moving to block 406, as described above at action 314 of signal diagram 300, OS 104 receives a request from screensharing application 108 to retrieve a list of display screens connected to user computer 102. In this example a single display screen 110 is connected to the user computer 102, but it is understood that any number of display screens may be connected, to the user computer 102. Moving to block 408, as described above at action 316 of signal diagram 300, OS 104 provides the requested list of display screens to screensharing application 108.

Moving to block 410, the OS 104 receives an instruction from screensharing application 108 to begin real time capture of the visual media of display screen 110, as described above at action 320 of signal diagram 300.

Moving to block 412, OS 104 begins real time capture of the visual media of display screen 110 in response to the instruction from screensharing application 108. In one embodiment, the method moves to block 414, and OS 104 receives an instruction from screensharing application 108 to block display of notification messages, as described above at action 322 of signal diagram 300. This request may be simultaneous with the instruction of block 410, or it may come before the instruction of block 410.

In another embodiment, the method may move from block 412 to block 415, where the OS 104 receives directly from user A, by any appropriate input means, an instruction to block display of notification messages, as described above at action 322 of signal diagram 300. Alternatively, the method may move from block 412 to block 416, where the OS 104 is pre-programmed to block display of notification messages, as described above at action 322 of signal diagram 300, when real time capture of the visual media of display screen 110 begins. In some embodiments of block 416, a user such as user A may be able to toggle a setting of OS 104 that causes OS 104 to have this behavior.

Moving to block 417, OS 104 begins relaying, or streaming, the real time capture of the visual media of display screen 110 to screensharing application 108, as described above at action 324 of signal diagram 300. For example, OS 104 may be responsible for sending display data from applications 117, messaging application 106, and the like to I/O hardware 212, and may simply relay this display data to screensharing application 108 at the same time that it handles display functionality.

Moving to block 418, OS 104 receives a request from messaging application 106 to open a messaging window 114 containing the message "hello," as described above at action 336 of signal diagram 300. Alternatively, if a messaging window 114 is already active, the messaging application 106 may request the OS 104 display the message "hello" in the messaging window 114, and may additionally request that the messaging window 114 be moved to the "front" of any other application windows 112 on display screen 110, that an icon related to the messaging application 106 blink, that a notification sound be played, or the like in order to alert user A of the newly received message. As described above with respect to action 336 of signal diagram 300, it is understood that OS 104 could additionally or alternatively receive requests from other applications 117 to display various messages in notification windows 116, or could internally generate notifications for display in a notification window 116. These messages may include, for example, software update reminders, security risk notifications, received email previews, calendar appointment reminders, and the like.

Moving to block 420, in accordance with the instruction received at block 414 and as described above at action 338 of signal diagram 300, OS 104 ignores the request and does not display the message window 112. By the same token, OS 104 does not add the message to an existing messaging window 116 or move that messaging window 116 to the front of the display screen 110. As described with respect to action 338 of signal diagram 300, it is understood that OS 104 also blocks any requests it receives from other applications 117 to display a notification message in a notification window 116, and additionally does not generate a notification window 116 to display any notifications generated internally by OS 104.

At block 422, as described above at action 348 of signal diagram 300, OS 104 receives an instruction from screensharing application 108 to stop capturing and relaying the visual media of display screen 110 to the screensharing application 108. Accordingly, at block 426, OS 104 stops relaying the visual media of display screen 110 to screensharing application 108 and stops real time capture of the visual media of display screen 110.

At block 426, as described above at action 356 of signal diagram 300, OS 104 receives a notification from screensharing application 108 that it may resume allowing notification windows 116, messaging windows 114, and the like to be displayed on display screen 110.

Figure 5:
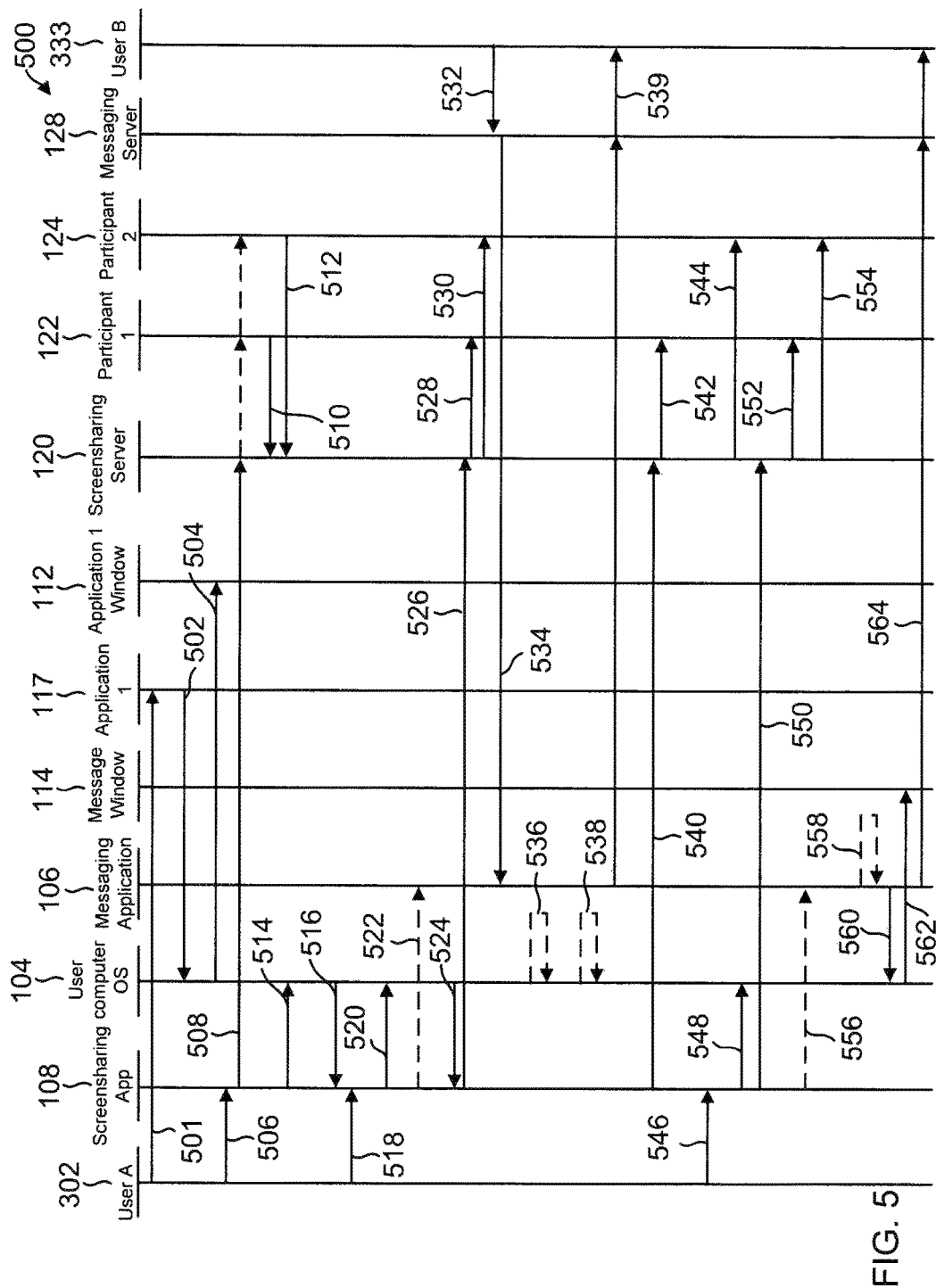
FIG. 5 is an illustration of an example signal flow diagram according to one embodiment for blocking notification messages at the messaging application level.
Figure 6:
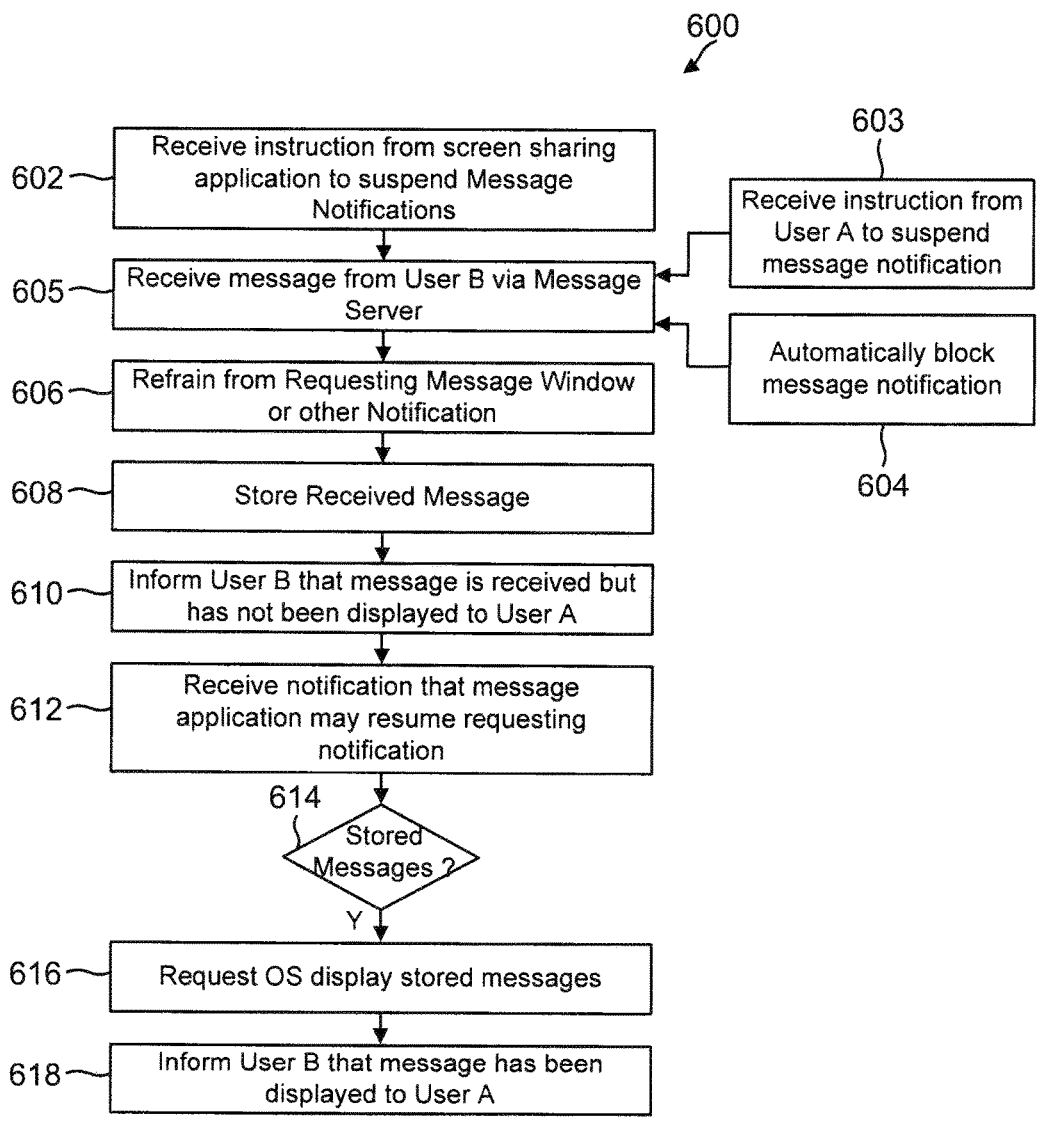
FIG. 6 is an illustration of an example flowchart according to one embodiment for for blocking notification messages at the messaging application level.

The embodiments of FIGS. 5 and 6 describe a system and method wherein a messaging application running on a user computer communicates with a screensharing application running on the user computer so that the messaging application refrains from requesting that instant messages received during a screensharing session be displayed on the user computer's display. The messaging application may store messages received during the screensharing session and request that they be displayed on the user computer's display after the screensharing application communicates to the messaging application that the screensharing session has ended.

FIG. 5 is a signal diagram 500 of notification blocking performed by the messaging application. It is understood that signal diagram 500 is one embodiment, and the actions shown in signal diagram 500 may be performed in a different order in other embodiments. Communications that take place in the actions of signal diagram 500 may be conducted with HTTP, SIP, SMPP, or any other appropriate protocol. Media streaming that takes place in the actions of signal diagram 500 may be conducted with h.264, VP8, or any other appropriate protocol. The below Table 2 contains labels for various elements of FIG. 5.

TABLE 2

Labels for elements of FIG. 5

| Identifier | Description | Identifier | Description | Identifier | Description |
| --- | --- | --- | --- | --- | --- |
| 501 | Open Application Window | 502 | Create Application 1 Window | 504 | Open Application 1 Window |
| 506 | Share display 110 | 508 | Start session | 510 | Connect |
| 512 | Connect | 514 | Get list of displays | 516 | List of displays |
| 518 | Share displays 110 | 520 | Start capture: Display 110 | 522 | Suspend Notification Windows |
| 524 | Content: Display 110 | 526 | Content: Display 110 | 528 | Content: Display 110 |
| 530 | Content: Display 110 | 532 | Message: "Hello" | 534 | Message: "Hello" |
| 536 | Message Notification Window blocked | 538 | Message Stored, awaiting delivery | 539 | Message Delivered |
| 540 | Content: Display 110 (with no Message Window | 542 | Content: Display 110 (with no Message Window) | 544 | Content: Display 110 (with no Message Window) |
| 546 | Stop sharing | 548 | Stop capture: Display 110 | 550 | Stop content Share |
| 552 | Stop content Share | 554 | Stop content Share | 556 | Resume Message Notifications |
| 558 | Checked for Stored Messages | 560 | Open Message Window: "Hello" | 562 | "Hello" |
| 564 | Message seen | | | | |

In the example of FIG. 5, actions 501-520 are the same as or substantially similar to the actions 301-320 of FIG. 3 (described in detail above). Therefore, the description of FIG. 5 begins at action 522. At action 522, the screensharing application 108 requests that the messaging application 106 suspend delivering message notifications to OS 104. In some embodiments, communication between screensharing application 108 and messaging application 106 may be facilitated by an API provided by each application to allow communication. In other embodiments, screensharing application 108 and messaging application 106 may be part of a single piece of software, such as a collaboration suite, allowing communication between the two applications.

Actions 524-534 are the same as or substantially similar to the actions 324-334 of FIG. 3 (described in detail above). Therefore, the description of FIG. 5 resumes at action 536. At action 536, in accordance with the request received at action 522, messaging application 106 refrains from sending a request to OS 104 to create a messaging window 114 on display 110. At action 538, messaging application 106 stores the message from user B for display to user A at a later time. For example, the messaging application 106 may store the message in secondary storage 210 of user computer 102. At action 539, messaging application 106 may send a message via messaging server 128 to user B on computer 126 to inform user B that the message "hello" has been delivered to user A's computer 102, but that the message has not been seen by user A.

Actions 540-546 are the same as or substantially similar to the actions 340-346 of FIG. 3 (described in detail above). Therefore, the description of FIG. 5 resumes at action 548. At action 548, screensharing application 108 requests that the OS 104 stop capturing the visual media of display 110. In some embodiments, the screensharing application 108 may directly inform the OS 104 that the screensharing session has been ended. At action 550, screensharing application 108 stops relaying the real time stream of the content of display 110 to screensharing server 120. The screensharing application 108 may also inform the screensharing server 120 that the screensharing session has been ended. Accordingly, at actions 552 and 554 the screensharing server 120 stops relaying the real time stream of the content of display 110 to participant 1's computer 122 and participant 2's computer 124, and may additionally inform them that the screensharing session has been terminated by user A.

At action 556, screensharing application 108 informs messaging application 106 that the screen sharing session is over and that it may resume requesting that OS 104 display messaging windows 114 on display 110 of user computer 102. In another embodiment, messaging application 106 may communicate with OS 104, and OS 104 may inform messaging application 106 that the screensharing session was ended at action 548. Messaging application 106 may be preprogrammed to resume requesting that OS 104 display messaging windows 114 in this case. In various other embodiments, any appropriate method of coordination between the messaging application 106 and the screensharing application 108 may be used to inform messaging application 106 that it may resume requesting display of messaging windows 114.

At action 558, messaging application 106 checks for undelivered messages that it stored for later display at action 538. For example, messaging application 106 may search secondary storage 210 for stored messages. In this case, it finds the message "hello" sent by the second user 333 (user B) at action 532. Accordingly, at action 560, messaging application 106 sends a request to OS 104 to create a messaging window 114 to display the message "hello." Alternatively, if a messaging window 114 already exists, messaging application 106 may request that the message "hello" be displayed in the existing messaging window 114 and may additionally request that the messaging window 114 be moved to the "front" of any other application windows 112 on display 110, that an icon related to the messaging application 106 blink, that a notification sound be played, or the like in order to alert user A of the newly received message.

At action 562, OS 104 complies with the request of action 560, creating a messaging window 114 on display 110 of computer 102 and displaying the message "hello" in the messaging window 114. Alternatively, if a messaging window 114 already exists on display 110, OS 104 may cause the message "hello" to be displayed in the messaging window 114, may move the messaging window 114 to the "front" of any other application windows 112 on display 110, may cause an icon related to the messaging application 106 blink, may cause a notification sound be played, or the like in order to alert user A of the newly received message. At action 564, messaging application 106 may send a message via messaging server 128 to user B at computer 126 to notify user B that the message "hello" sent at action 532 has been displayed to user A.

FIG. 6 is a flow diagram of a method 600 for blocking notification messages at the messaging application level, and it accompanies FIG. 5. It is understood that method 600 is one embodiment, and the blocks shown in method 600 may be performed in a different order in other embodiments. Communications that take place in the blocks of method 600 may be conducted with HTTP, SIP, SMPP, or any other appropriate protocol. Media streaming that takes place in the blocks of method 600 may be conducted with h.264, VP8, or any other appropriate protocol.

Beginning at block 602, as described above at action 522 of signal diagram 500, messaging application 106 running on user computer 102 receives an instruction from screensharing application 108 to suspend delivering message notifications to OS 104. In another embodiment, beginning at block 603, messaging application 106 running on user computer 102 receives an instruction from user A by any appropriate input means to suspend delivering message notifications to OS 104.

Alternatively, beginning at block 604, messaging application 106 running on user computer 102 may be preprogrammed to suspend delivering message notifications to OS 104 while a screensharing session is active on user computer 102. In another embodiment of block 604, a user such as user A may toggle a setting in the messaging application 106 that causes it to suspend delivering message notifications to OS 104 while a screensharing session is active on user computer 102. The messaging application 106 may discover that a screensharing session is active in various ways. For example, the screensharing application 108 and the messaging application 106 may be integrated into a single application, and the messaging application 106 may be aware when a screensharing session is active. In another example, the messaging application 106 may receive notification from OS 104 that a screensharing session is active.

Moving to block 605, as described above at action 534 of signal diagram 500, messaging application 106 receives a textual message from user B via messaging server 128. In this example, the textual message simply says "hello." Moving to block 606, as described above at action 536 of signal diagram 500, and in accordance with the instruction received at block 602, messaging application 106 refrains from requesting that the OS 104 create a messaging, window 114 on display 110 to display the textual message received from user B.

Moving, to block 608, as described above at action 538 of signal diagram 500, messaging application 106 may store the textual message from user B for display to user A at a later time. Moving to block 610, as described above at action 539 of signal diagram 500, messaging application 106 informs user B at computer 126 via messaging server 128 that the textual message was delivered to user A's computer 102 but not displayed to user A.

Moving to block 612, as described above at action 556 of signal diagram 500, messaging application 106 receives an instruction from screensharing application 108 that it may resume requesting that OS 104 display messaging windows 114 on display 110. Moving to block 614, as described above at, action 558 of signal diagram 500, messaging application 106 determines whether any textual messages were stored at block 608.

Moving to block 616, as described above at action 560 of signal diagram 500, if stored textual messages are found, messaging application 106 requests that OS 104 create a messaging window 114 and display the textual message "hello." Alternatively, if a messaging window 114 already exists, messaging, application 106 may request that the textual message "hello" be displayed in the existing messaging window 114 and may additionally request that the messaging window 114 be moved to the "front" of any other application windows 112 on display 110, that an icon related to the messaging application 106 blink, that a notification sound be played, or the like in order to alert user A of the newly received textual message.

Moving to block 618, as described above at action 564 of signal diagram 500, if stored textual messages are found, messaging application 106 informs user B at computer 126 via messaging, server 128 that the textual message "hello" has been displayed to user A.

Figure 7:
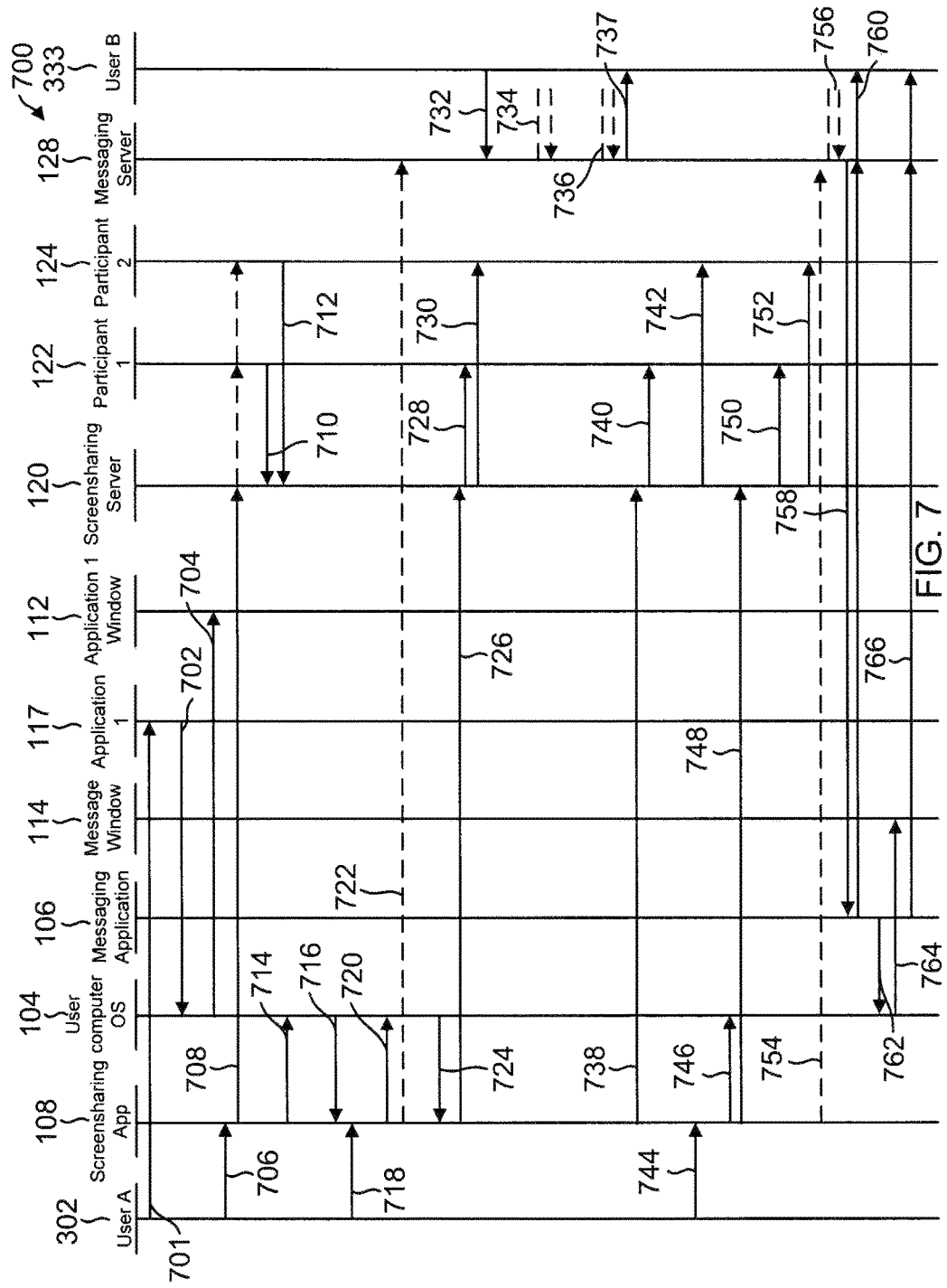
FIG. 7 is an illustration of an example signal flow diagram according to one embodiment for blocking notification messages at the messaging server level.
Figure 8:
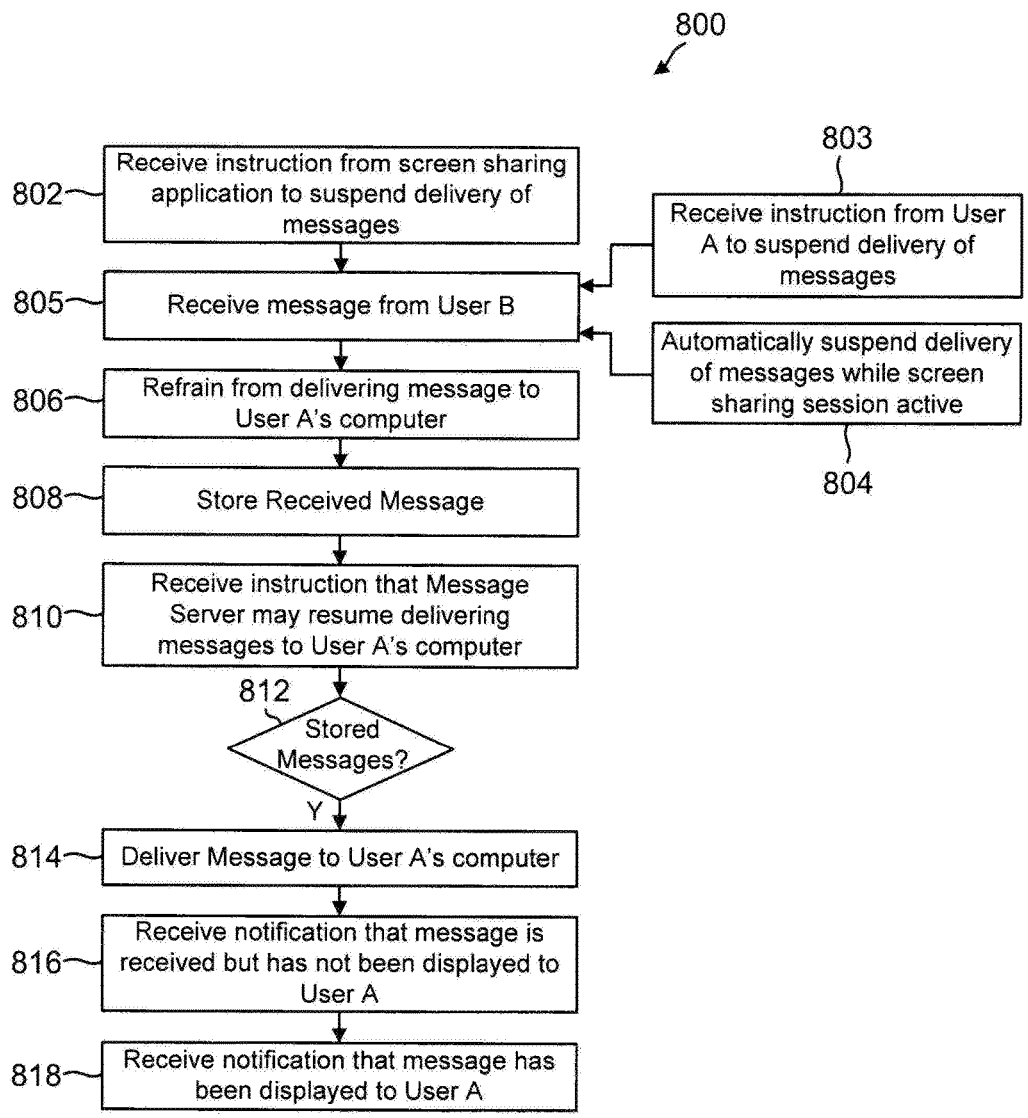
FIG. 8 is an illustration of an example flowchart according to one embodiment for blocking notification messages at the messaging server level.

The embodiments of FIGS. 7 and 8 describe a system and method wherein a messaging server communicates with a screensharing application running on a user computer so that the messaging server refrains from sending messages to the user computer for the duration of a screensharing session. The messaging server may be responsible for routing messages between messaging applications on different user computers, and accordingly may store messages for delivery after the screensharing session has ended.

FIG. 7 is a signal diagram 700 of notification blocking performed by the messaging server. It is understood that signal diagram 700 is one embodiment, and the actions shown in signal diagram 700 may be performed in a different order in other embodiments. Communications that take place in the actions of signal diagram 700 may be conducted with HTTP, SIP, SMPP, or any other appropriate protocol. Media streaming that takes place in the actions of signal diagram 700 may be conducted with h.264, VP8, or any other appropriate protocol. The below Table 3 contains labels for various elements of FIG. 7.

the message from user B for delivery to messaging application 106 on user A's computer 102 at a later time. For example, messaging server 128 may be a computer device with secondary storage similar to secondary storage 210, and it may store the message in its secondary storage. At action 737, messaging server 128 sends a notification to user B's computer 126 to inform user B that the message sent at action 732 has been blocked and was not delivered to messaging application 106.

Actions 738-752 are the same as or substantially similar to the actions 340-354 of FIG. 3 (described above). Therefore, the description of FIG. 7 resumes at action 754. At action 754, screensharing application 108 informs messaging server 128 that it may resume sending messages to messaging application 106 on user A's computer 102.

At action 756, messaging server 128 checks for undelivered messages that it stored for later delivery to user A. For example, messaging server 128 may search secondary storage for stored messages. In this case, it finds the message "hello" sent by user B at action 732. Accordingly, at action 758, messaging server 128 delivers the stored message to messaging application 106 on user A's computer 102. At action 760, messaging application 106 may send a message via messaging server 128 to user 13 on computer 126 to inform user B that the message "hello" has been delivered to user A's computer 102, but that the message has not yet been displayed to user A.

TABLE 3

Labels for elements of FIG. 7

| Identifier | Description | Identifier | Description | Identifier | Description |
|---|---|---|---|---|---|
| 701 | Open Application Window | 702 | Create Application 1 Window | 704 | Open Application 1 Window |
| 706 | Start session | 708 | Start session | 710 | Connect |
| 712 | Connect | 714 | Get list of displays | 716 | List of displays |
| 718 | Share displays 1 | 720 | Start capture: Display 110 | 722 | Suspend Message Notifications |
| 724 | Content: Display 110 | 726 | Content: Display 110 | 728 | Content: Display 110 |
| 730 | Content; Display 110 | 732 | Message: "Hello" | 734 | Message Notification Window blocked |
| 736 | Message Stored, awaiting delivery | 737 | Message blocked | 738 | Content: Display 110 (with no Message Window) |
| 740 | Content: Display 110 (with no Message Window) | 742 | Content: Display 110 (with no Message Window) | 744 | Stop sharing |
| 746 | Stop capture: Display 110 | 748 | Stop content Share | 750 | Stop content Share |
| 752 | Stop content Share | 754 | Resume message Notifications | 756 | Checked for Stored messages |
| 758 | Message: "Hello" | 760 | Message Delivered | 762 | Open Message Window: "Hello" |
| 764 | "Hello" | 766 | Message seen | | |

In the example of FIG. 7, actions 701-720 are the same as or substantially similar to the actions 301-320 of FIG. 3 (described above). Therefore, the description of FIG. 7 begins at action 722. At action 722, the screensharing application 108 requests that the messaging server 128 suspend delivering, messages to messaging application 106 on user computer 102.

Actions 724-732 are the same as or substantially similar to the actions 324-332 of FIG. 3 (described above). Therefore, the description of FIG. 7 resumes at action 734. At action 734, in accordance with the request received at action 722, messaging server 128 refrains from sending the instant message of action 732 to messaging application 106 on computer 102. At action 736, messaging server 128 stores At action 762, messaging application 106 sends a request to OS 104 to create a messaging window 114 to display the message "hello." Alternatively, if a messaging window 114 already exists, messaging application 106 may request that the message "hello" be displayed in the existing messaging window 114 and may additionally request that the messaging window 114 be moved to the "front" of any other application windows 112 on display 110, that an icon related to the messaging application 106 blink, that a notification sound be played, or the like in order to alert user A of the newly received message.

At action 764, OS 104 complies with the request of action 762, creating a messaging window 114 on display 110 of computer 102 and displaying the message "hello" in the messaging window 114. Alternatively, if a messaging window 114 already exists on display 110, OS 104 may cause the message "hello" to be displayed in the messaging window 114, may move the messaging window 114 to the "front" of any other application windows 112 on display 110, may cause an icon related to the messaging application 106 blink, may cause a notification sound be played, or the like in order to alert user A of the newly received message. At action 766, messaging application 106 may send a message via messaging server 128 to user B at computer 126 to notify user B that the message "hello" sent at action 532 has been displayed to user A.

In this embodiment, OS 104, messaging application 106, and screensharing application 108 run on user A's computer 102. It is understood that in other embodiments these applications may run in some combination on two or more separate devices connected, for example, by a network 118.

FIG. 8 is a flow diagram of a method 800 for blocking notification messages at the messaging application level, and it accompanies FIG. 7. It is understood that method 800 is one embodiment, and the blocks shown in method 800 may be performed in a different order in other embodiments. Communications that take place in the blocks of method 800 may be conducted with HTTP, SIP, SMPP, or any other appropriate protocol. Media streaming that takes place in the blocks of method 800 may be conducted with h.264, VP8, or any other appropriate protocol.

Beginning at block 802, as described above at action 722 of signal diagram 700, messaging server 128 receives an instruction from screensharing application 108 to suspend delivering messages to messaging application 106 of user A's computer 102. In another embodiment, beginning at block 803, messaging server 128 may receive an instruction from user A to suspend delivering messages to messaging application 106. For example, user A may send such an instruction via messaging application 106.

Alternatively, beginning at block 804, the messaging server 128 may be pre-programmed to automatically suspend delivering messages to messaging application 106 while a screensharing session is actively being hosted on user computer 102. In another embodiment, of block 804, a user such as user A may toggle a setting at the messaging server 128 that causes it to suspend delivering messages to messaging application 106 while a screesharing session is active on user computer 102. The messaging server 128 may discover that a screensharing session is active in various ways. For example, messaging application 106 may be integrated with screensharing application 108 such that messaging application 106 is aware when a screensharing session is active, messaging, application 106 may communicate to messaging server 128 that a screensharing session is active, and messaging server 128 may automatically suspend delivering messages to messaging application 106.

Moving to block 805, as described above at action 732 of signal diagram 700, messaging application 106 receives a message from user B on computer 126. In this example, the message simply says "hello," Moving to block 806, as described above at action 734 of signal diagram 700, and in accordance with the instruction received at block 802, messaging server 128 refrains from delivering the message received at block 804 to messaging application 106 of user A's computer 102. Moving to block 808, as described above at action 736 of signal diagram 700, messaging server 128 stores the message from user B for display to user A at a later time.

Moving to block 810, as described above at action 754 of signal diagram 700, messaging server 128 receives an instruction from screensharing application 108 that it may resume delivering messages to messaging application 106 on user A's computer 102. Moving to block 812, as described above at action 756 of signal diagram 500, messaging server 128 determines whether any messages were stored at block 808.

Moving to block 814, as described above at action 758 of signal diagram 700, if stored messages are found, messaging server 128 delivers them to messaging application 106 of user A's computer 102. Moving to block 816, as described above at action 760 of signal diagram 700, messaging application 106 informs messaging server 128 that the message was delivered to user A's computer 102 but not displayed to user A, which messaging server 128 relays to user B at computer 126. Moving to block 818, as described above at action 766 of signal diagram 700, messaging application 106 informs messaging server 128 that the message delivered at block 814 has been displayed to user A, and messaging server 128 relays the notification to user B on computer 126.

Various embodiments of the present disclosure may include advantages over prior solutions. In conventional systems, when a user's entire display is shared during a screensharing session, various sorts of sensitive information that is displayed as a popup notification may be shared with the participants of the screensharing session. By contrast, various embodiments herein cause an operating system to suspend display of notifications, or cause a messaging application or a messaging server to suspend delivery of messages, thereby improving the user's security and privacy by preventing accidental dissemination of confidential or private information. Furthermore, automating the above features to activate any time a screensharing session is initiated protects the user from human error (e.g., protects the user from his own forgetfulness in activating a manual notification blocking system or method).

Furthermore, present embodiments solve a problem unique to network, communications. For example, the need to prevent accidental sharing of sensitive messages during a presentation did not exist prior to the use of screensharing software and communication networks.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method comprising:
receiving, by an operating system of a computer, a first instruction from a screensharing application to suspend displaying notification messages by the operating system of the computer;
sending visual media of a display screen of the computer by the operating system to the screensharing application during a screen sharing communication session;
in response to receiving a request from a first application to display a notification message on the display screen, disregarding the request during the screen sharing communication session in accordance with the first instruction; and after termination of the screen sharing communication session, displaying the notification message on the display screen.

2. The method of claim 1, further comprising receiving a second instruction from the screensharing application to resume displaying notification messages.

3. The method of claim 1, wherein the notification message includes an instant message, an email preview, or a notification from other applications.

4. The method of claim 1, further comprising:
receiving, by the operating system, a request from the screensharing application to generate a list of one or more display screens connected to the computer;
generating the list of the one or more display screens in response to the request from the screensharing application; and
sending the list of the one or more display screens to the screensharing application.

5. The method of claim 1, further comprising:
after receiving a second instruction to resume displaying notification messages, receiving a subsequent request from the first application to display the notification message; and
in response to receiving the subsequent request to display the notification message, displaying the notification message on the display screen.

6. The method of claim 5, further comprising:
prior to sending the visual media of the display screen to the screensharing application, receiving, by the operating system, a third instruction to begin capturing the output of the display screen; and
prior to receiving the second instruction from the screensharing application to resume displaying notification messages, receiving a fourth instruction from the screensharing application to cease capturing the output of the display screen.

7. The method of claim 6, further comprising:
in response to receiving the fourth instruction from the screensharing application to cease capturing the output of the one or more displays, ceasing to capture the output of the one or more displays.

8. The method of claim 1, further comprising opening one or more application windows on the display screen.

9. A computing device, comprising:
a memory containing a machine readable medium comprising machine executable code having stored thereon instructions for performing a method of suspending display of textual messages;
a processor coupled to the memory, the processor configured to execute the machine executable code to perform the following actions by a messaging application executed by the processor:
receive, by the messaging application, a first instruction from a screensharing application to suspend displaying textual messages on a display screen of a computer executing the screen sharing application during a screen sharing communication session;
store a first textual message received from a messaging server in response to receiving the first instruction and without causing the first textual message to be displayed;
receive a second instruction from the screensharing application to resume displaying textual messages, wherein the second instruction is received in response to an end of the screen sharing communication session; and
display the first textual message in response to receiving the second instruction.

10. The computing device of claim 9, wherein the processor is further configured to execute the machine executable code to inform a sender of the received first textual message, prior to receiving the second instruction, that the received first textual message has not been displayed.

11. The computing device of claim 10, wherein the informing the sender that the received first textual message has not been displayed includes informing the messaging server that the received first textual message has not been displayed.

12. The computing device of claim 9, wherein the processor is further configured to execute the machine executable code to inform a sender of the received first textual message, after requesting that the operating system display the stored first textual message, that the received first textual message has been displayed.

13. The computing device of claim 12, wherein the informing the sender that the received first textual message has been displayed includes informing the messaging server that the received first textual message has been displayed.

14. The computing device of claim 9, wherein the processor is further configured to execute the machine executable code to request that the operating system play a notification sound, cause an icon to blink, or move the instant message to the front of a display on which the instant message is displayed.

15. The computing device of claim 9, wherein the textual messages include instant messages.

16. The computing device of claim 9, wherein the suspending displaying textual messages comprises suspending requesting that an operating system running on the computer executing the screen sharing application display the textual messages.

17. A computer program product having a non-transitory computer readable medium tangibly recording computer program logic, the computer program product comprising:
code to receive a first instruction from a screensharing application to suspend displaying notification messages by the operating system of the computer;
code to send visual media of a display screen of the computer by the operating system to the screensharing application during a screen sharing communication session; and
code to, in response to receiving a request from a first application to display a notification message on the display screen, delaying display of the notification message on the display screen until after termination of the screen sharing communication session in accordance with the first instruction.

18. The computer program product of claim 17, further comprising code to disregard the request during the screen sharing communication session in accordance with the first instruction.

19. The computer program product of claim 17, further comprising: code to receive a second instruction from the screensharing application to resume displaying notification messages.

20. The computer program product of claim 17, wherein the notification message includes an instant message, an email preview, or a notification from other applications.

* * * * *